US008548954B2

(12) United States Patent
Cina

(10) Patent No.: US 8,548,954 B2
(45) Date of Patent: Oct. 1, 2013

(54) ARCHIVING SYSTEM FOR MASSIVE DATABASES USING PRE-COMPUTED DATA LIFECYCLES

(75) Inventor: Miroslav Cina, Hanhofen (DE)

(73) Assignee: SAP AG, Walldorf (DE)

( * ) Notice: Subject to any disclaimer, the term of this patent is extended or adjusted under 35 U.S.C. 154(b) by 565 days.

(21) Appl. No.: 12/266,981

(22) Filed: Nov. 7, 2008

(65) Prior Publication Data
US 2010/0088284 A1    Apr. 8, 2010

Related U.S. Application Data

(60) Provisional application No. 61/103,170, filed on Oct. 6, 2008.

(51) Int. Cl.
*G06F 17/30*        (2006.01)
(52) U.S. Cl.
USPC ......................................................... 707/665

(58) Field of Classification Search
USPC ......................................................... 707/665
See application file for complete search history.

(56) References Cited

U.S. PATENT DOCUMENTS

2006/0004868 A1* 1/2006 Claudatos et al. ......... 707/104.1

* cited by examiner

*Primary Examiner* — Huawen Peng
(74) *Attorney, Agent, or Firm* — Kenyon & Kenyon LLP

(57) ABSTRACT

An enterprise management system includes transaction/analytic applications and an archiving system in which data object lifecycles are pre-computed when the data object is created by the transaction application or analytic application. Having pre-computed the data lifecycle via the transaction/analytic applications, an archiving system need not re-determine whether the criteria for archiving are met. When the archiving system is initiated, the archiving system may identify the data objects having lifecycle dates that match the current date and archive them directly.

17 Claims, 4 Drawing Sheets

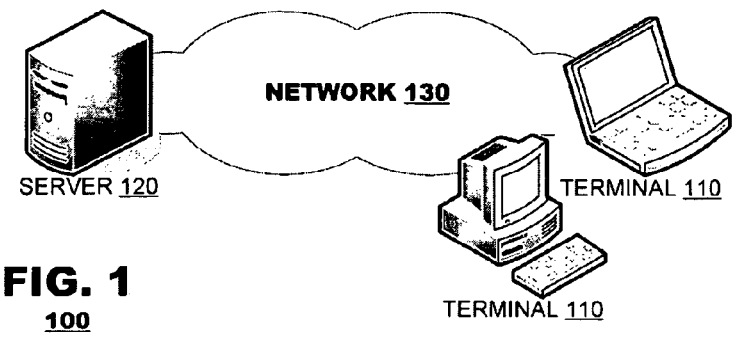
FIG. 1
100
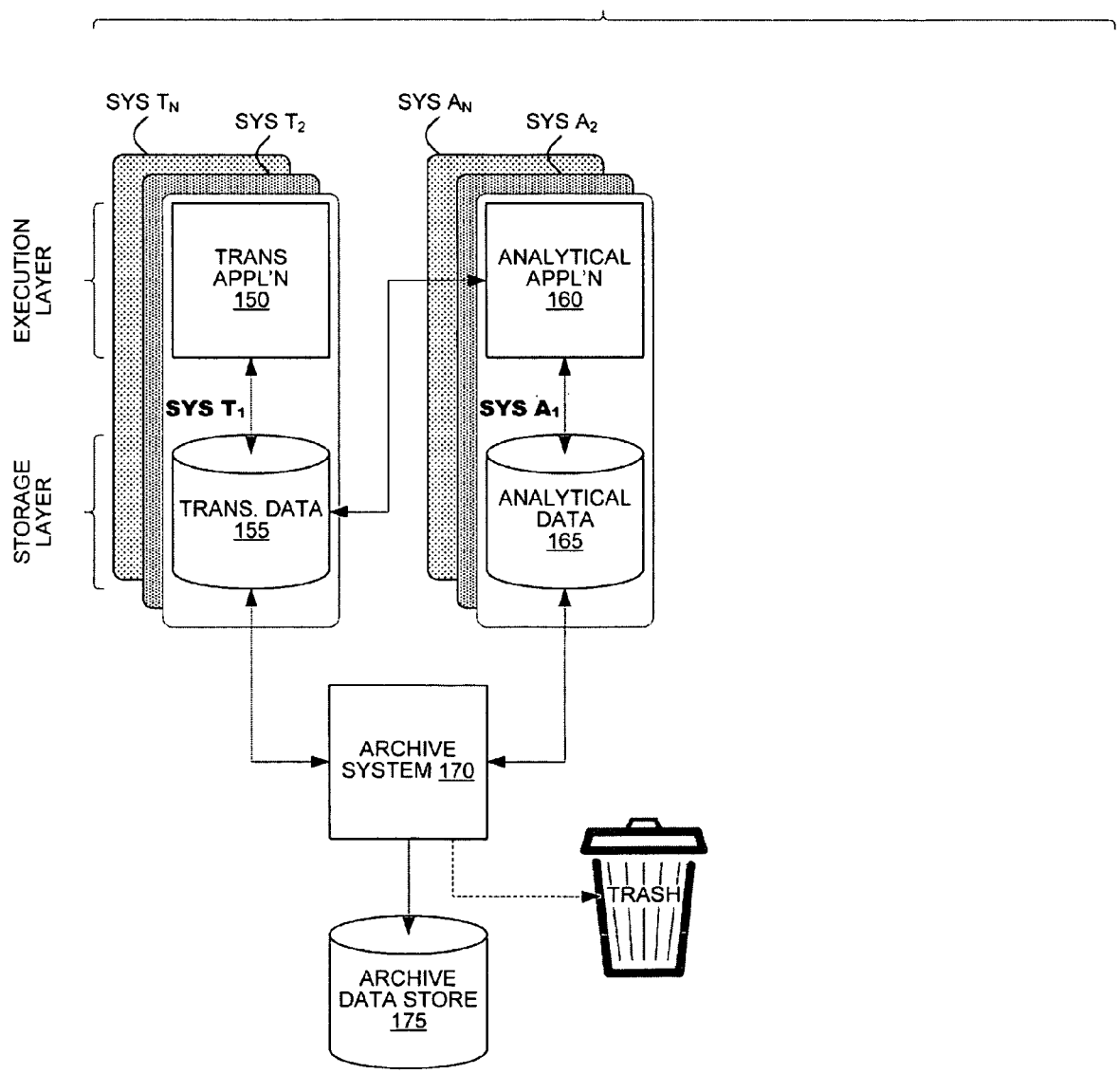

200

300

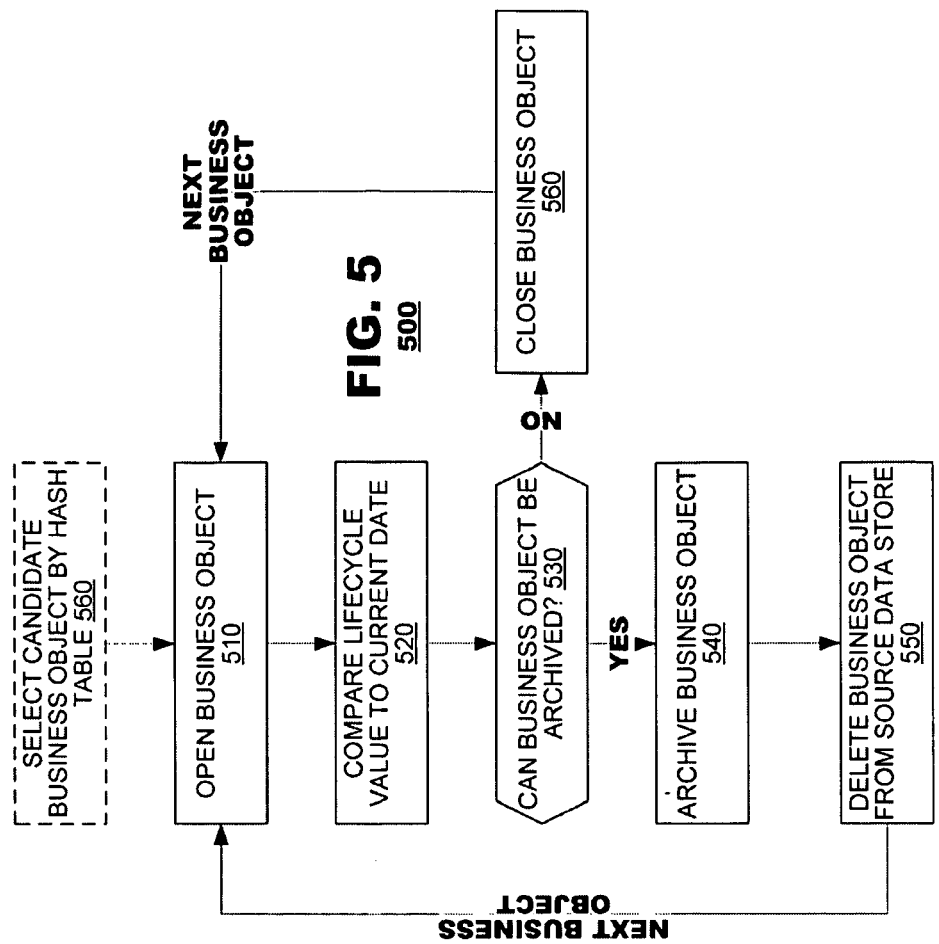
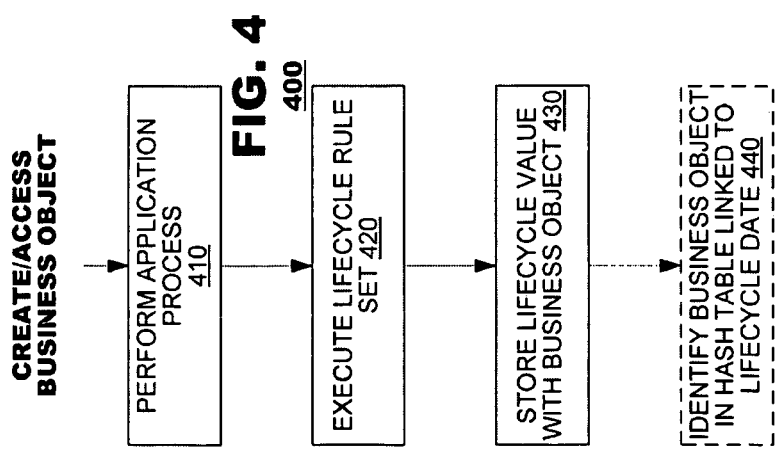

| DATE | OBJECT TYPE | OBJECT ID |
|------|-------------|-----------|

FIG. 6
600

ARCHIVING SYSTEM FOR MASSIVE DATABASES USING PRE-COMPUTED DATA LIFECYCLES

RELATED APPLICATIONS

This application is a non-provisional of U.S. Application No. 61/103,170 filed Oct. 6, 2008 (pending), the contents of which are incorporated herein by reference.

BACKGROUND

The present invention relates to an archiving system in an enterprise management system in which a lifecycle of a business object stored by the enterprise management system is computed at the time the business object is created and updated when/if the business object is accessed. During archiving, the enterprise management system may compare a current date to the lifecycle data present in the business object.

Enterprise management systems are well known. FIG. 1 is a block diagram of a computer system 100 that may operate as an enterprise management system. The system 100 may include one or more terminals 110 and severs 120 provided in communication with each other via a network 130. The number of terminals 110, number of servers 120 and topology of the network 130 is immaterial to the present discussion unless noted otherwise herein. The system 100 may operate as an enterprise management system in which various application programs interoperate to manage business functions of a firm, typically a company.

FIG. 1 also illustrates an exemplary application architecture common to enterprise management systems. The enterprise management system may include one or more transaction applications 150 that support discrete business transactions of the company. The transaction application 150 typically generates and manages its own transaction data 155, which is stored in a database. Exemplary transaction applications may include:
- customer relations management (CRM) applications, which manage customer-facing operations such as product marketing and product sales,
- supply chain management (SCM) applications, which manage vendor-facing operations such as materials ordering,
- product lifecycle management, and
- human resources management.

Other applications can be included in an enterprise management system. In each application, individual enterprise transactions are represented by business objects. "Business objects" are data objects maintained by the enterprise management system that include business logic, data identifying process steps to be performed to complete a respective transaction, and business data, the data collected during performance of the transaction.

An enterprise management system also may include analytical applications 160, which perform analyses of transactional data and generate analytical reports that can be used to measure enterprise performance. A variety of analytical applications 160 also are available, each of which commonly generates and maintains its own data set 165. As the analytical application 160 executes its operations, it also may generate business objects which include business logic defining the analytical operation being performed and the data gathered during performance of the analytical operation.

The enterprise management system 100 also may include an archive system 170, which is a management utility that reviews stored business objects of the enterprise management system and identifies business objects that no longer need to be stored by the respective applications. If a business object meets criteria for archiving, the business object may be removed from the data store 155, 165 of the respective application and stored in an archive data store 175 or may be deleted from the system altogether (represented by trash).

When determining whether a business object can be archived, common solutions perform a preprocessing step that searches among the data stores for all obsolete data objects. Preprocessing involves reviewing each data object present in the data store, determining whether criteria for archiving are met and, when the criteria are met, setting a flag associated with the data object to indicate the respective object should be archived. Data migration, the act of moving or deleting data objects, can occur only after the preprocessing step concludes.

As can be appreciated, large enterprises can generate perhaps ten thousand business objects per day. Thus, the system's data stores 155, 165 may store possibly millions of business objects for which the archiving criteria may be unique. The number of data objects present in a storage layer of the enterprise management system causes the system to incur a high cost to perform the archiving process. Resources allocated to the archiving process, which is an administrative process within the system, cannot be allocated to perform transaction or analytical operations.

Accordingly, there is a need in the art for an archiving process in an enterprise management system that incurs lower cost than previously known approaches.

BRIEF DESCRIPTION OF THE DRAWINGS

FIG. 1 is a block diagram of a computer system 100 according to an embodiment of the present invention.

FIG. 4 illustrates a method according to an embodiment of the present invention.

FIG. 5 illustrates a method according to another embodiment of the present invention.

FIG. 6 illustrates an archive index table according to an embodiment of the present invention.

DETAILED DESCRIPTION

Embodiments of the present invention provide an enterprise management system that includes transaction/analytic applications and an archiving system in which data object lifecycles are pre-computed when the data object is created by the transaction application or analytic application. Having pre-computed the data lifecycle, an archiving system may operate with reduced resources because it need not re-determine whether the criteria for archiving are met. When the archiving system is initiated, the archiving system may identify the data objects having lifecycle dates that match the current date and archive them directly.

Figure 2:
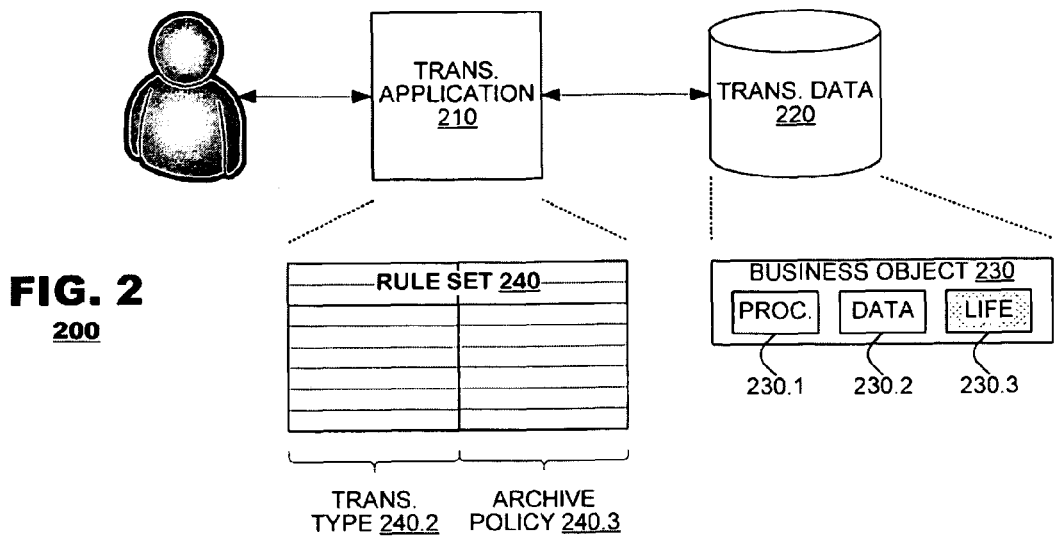
FIG. 2 illustrates interaction between a transaction application, a transaction data store and a user according to an embodiment of the present invention.

FIG. 2 schematically illustrates interaction between a transaction application 210, a transaction data store 220 and a user according to an embodiment of the present invention. As discussed, transaction applications 210 interact with users to manage business functions. By way of example, consider a transaction in which a user generates a purchase order representing a purchase of products offered by the enterprise. The user (who may be a customer) interacts with the transaction application 210 to create a new purchase, which causes the transaction application 210 to generate a new business object 230 in the data store 220. The business object may include logic 230.1 defining the process steps that must be completed to perform the transaction and may include data fields 230.2 representing the data that defines the respective purchase order (for example, identifiers of products being ordered, quantities or products, agreed upon prices, customer identifiers, etc.). In this regard, the operation of transaction applications 210 and structure of business objects are well known.

According to an embodiment, a transaction application 210 also may include program instructions that cause the application to generate a lifecycle indicator 230.3 and store it with the business object 230. The transaction application 210 may interact with a rule set 240 that identifies how to compute the lifecycle of the business object 230. The rule set 240 may be provided as a multi-entry data table that identifies conditions that must be met before a respective rule can be applied, then a lifetime policy from which the lifecycle of the business object 230 may be calculated. Thus, an overall archiving policy may be tuned for each installation of the enterprise management system. Archiving policies may establish different lifecycles for different types of transactions (e.g., purchase orders vs. invoices) and, therefore, the rule set may identify a business object type in the conditions field 240.2.

Figure 3:
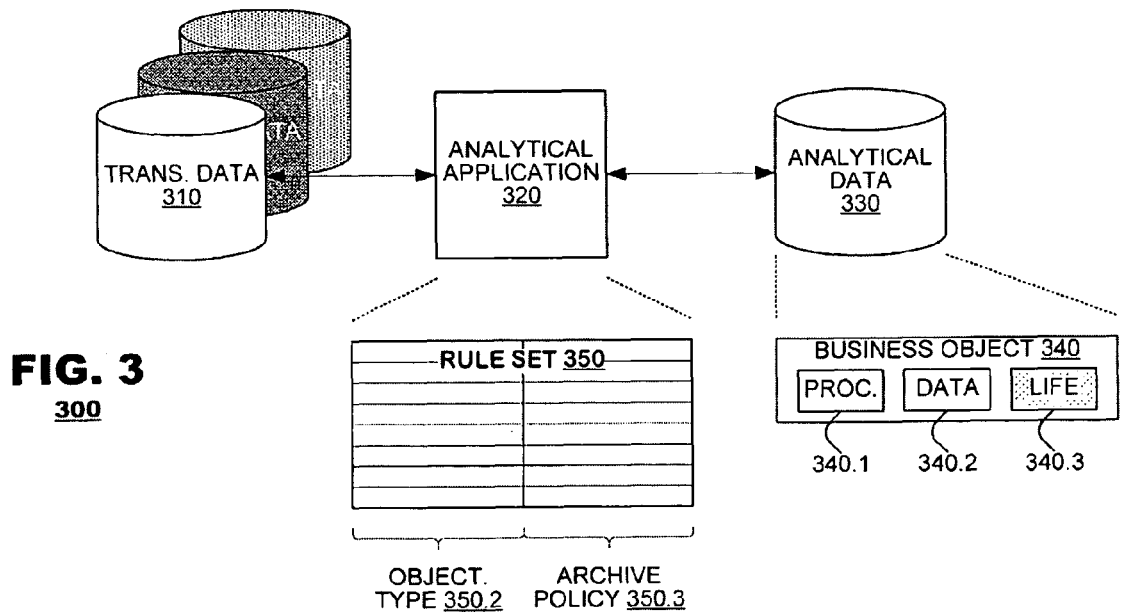
FIG. 3 illustrates interaction between an analytical application, an analytic data store and a transaction data store 220 according to an embodiment of the present invention.

FIG. 3 schematically illustrates interaction between a transaction data store 310, an analytical application 320 and an analytical data store 340 according to an embodiment of the present invention. As discussed, analytical applications 320 interact with one or more transaction data store 310 to gather data on which to perform analytical operations. The analytical application 320 generates new business objects 340 in the data store 320 for each analytical process the application 320 is to perform. The business object may include logic 340.1 defining the process steps that must be completed to perform the analytical process and may include data fields 340.2 representing the data that defines the respective analytical process. In this regard, the operation of transaction applications 310 and structure of business objects are well known.

According to an embodiment, the analytical application 320 also may include program instructions that cause the application to generate a lifecycle indicator 340.3 and store it with the business object 340. The analytical application 320 may interact with a rule set 350 that identifies how to compute the lifecycle of the business object 340. The rule set 350 may be provided as a multi-entry data table that identifies conditions that must be met before a respective rule can be applied, then a lifetime policy from which the lifecycle of the business object 340 may be calculated. Thus, an overall archiving policy may be tuned for each installation of the enterprise management system. Archiving policies may establish different lifecycles for different types of analytic processes and, therefore, the rule set may identify a business object type in the conditions field 340.2.

Thus, according to an embodiment of the invention, each business object may store a lifecycle date that identifies a date on which the respective object can be archived or otherwise removed from the storage layer (FIG. 1) of the enterprise management system. This lifecycle date may be calculated upon object creation and also during operations of the execution layer (FIG. 1) that cause accesses to the business object. Object creation operations and access operations are made pursuant to substantive operations of the respective transaction applications or analytical applications and, therefore, do not impose new burdens upon the system.

FIG. 4 illustrates a method 400 according to an embodiment of the present invention, which can be used to create or revise lifecycle dates stored in a business object. The method 400 may be performed at such times when a business object is created or when it is accessed pursuant to an application process (e.g. a transactional application process or an analytical application process). According to the method, the application process may be performed (box 410) and, upon its conclusion, the application may review the lifecycle rules to determine whether an archive policy applies to the business object being used. If so, the application may execute the lifecycle rule set, which calculates/recalculates a lifecycle date for the business object (box 420). The method may store the lifecycle value with the business object (box 430). Thereafter, the method may conclude.

FIG. 5 illustrates a method 500 according to another embodiment of the present invention, which can be used during archiving. The method may begin by opening a business object that is a candidate for archiving (box 510). Once opened, the method may compare the lifecycle value present in the business object to the current date (box 520). The method may determine whether the business object can be archived (box 530), which may occur if the lifecycle date has elapsed. If the business object can be archived (box 540), it may be archived, for example, by copying it from the storage layer to long term storage. Thereafter, the business object may be deleted from the source data store (box 550) (e.g., the transaction data store 155 or the analytic data store 165). If the business object cannot be archived, the method may be closed (box 560). At the conclusion of the operations of box 550 or box 560, the method may advance to the next business object.

In an embodiment, the archiving system may utilize a hash table or other index that associates business objects with their lifecycle dates. In such an embodiment, the method of FIG. 4 may be expanded to include an operation that, after the lifecycle date is calculated and successfully stored in the data store 155, 165, links the business object to a hash table entry associated with the lifecycle date. Continuing with this embodiment, the method of FIG. 5 also may be expanded to include a predecessor step of selecting candidate business objects based on links provided in the hash table. Thus, this embodiment permits the operations listed in boxes 510-560 to be limited to the business object(s) identified in the hash table which further limits resources that would be allocated to an archiving process.

Figure 6:
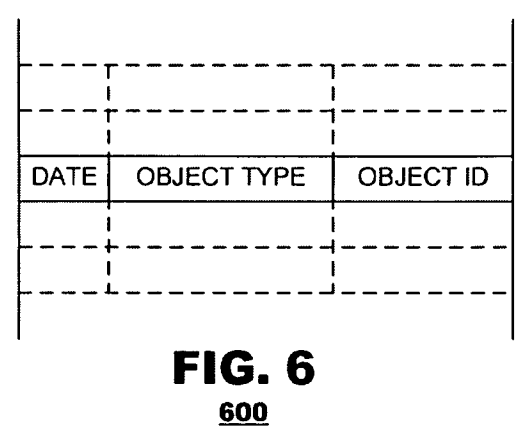

In another embodiment, the archiving system may store an archiving index table 600 as shown in FIG. 6. The archiving index table may store identifiers of business objects in association with their lifecycle dates, which permits the archiving system to identify the business object(s) that can be archived without requiring direct access to all business objects stored by the system. As shown in FIG. 6, each entry in the table may include three fields, identifying a lifecycle date, an object type and an object ID. The archiving system may review the lifecycle date to determine whether the entry refers to an archivable business object. If so, the system may use the object type and object ID fields to identify a data store 155, 165 in which the business object may be found. The archiving system may access the business object, copy it to long term store and remove it from the data store 155, 165.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. An enterprise management system, comprising:
a server, including a transaction system executing on the server, the transaction system comprising a transactional application and data store associated therewith, the transaction system storing business objects comprising transaction data, a lifecycle date, and business logic defining at least one transaction process step; and
a data store coupled to the server to store a rule set associated with the transaction system to be accessed by the transactional application during creation of business objects, the rule set storing data representing archiving policies for the enterprise management system,
the transactional application to perform at least one transaction process step upon transaction data of the business object as determined by business logic of the business object and, upon completion of the at least one transaction process step, to compute on the server a new lifecycle date of the business object using data from the rule set and to store the computed lifecycle date in the business object following access to the rule set,
the transactional application to provide identification of the business object and the computed lifecycle date of the business object for use by an archiving system prior to the execution of an archive process, and
the archiving system, upon execution of a batch archive process, to compare lifecycle dates of stored business objects to a current date and archive business objects for which the lifecycle date is elapsed.

2. The enterprise management system of claim 1, wherein:
upon calculation of a lifecycle date and storage thereof in a business object, the transactional application stores an identifier of the respective business object in a hash table accessible by the archiving system, and
upon execution of the batch archive process at the current date, the archiving system performs the comparison only for those business objects that the hash table has linked to the current date.

3. The enterprise management system of claim 1, wherein:
upon calculation of a lifecycle date and storage thereof in a business object, the transactional application stores the calculated lifecycle date and an identifier of the respective business object in an entry of archiving index table accessible by the archiving system, and
upon execution of the batch archive process at the current date, the archiving system performs the comparison only for those business objects listed in entries that archiving index table stores in association with the current date.

4. The enterprise management system of claim 1, wherein the accessing of the rule set is triggered by user interaction with the transactional application causing a business object to be created representing a business transaction performed by a proprietor of the enterprise management system.

5. The enterprise management system of claim 1, wherein the transactional system also refers to the rule set and recalculates a lifecycle date pursuant to a transaction that accesses the business object.

6. An enterprise management system, comprising:
a server, including an analytic system executing on the server, the analytic system comprising an analytical application, the analytic system maintaining business objects comprising analytic data, a lifecycle date, and business logic defining at least one transaction process step,
a data store to store data associated with the analytical application;
wherein the data store maintains a rule set stored in association with the analytic system to be accessed by the analytical application during creation of business objects, the rule set storing data representing archiving policies for the enterprise management system,
the analytical application to perform at least one transaction process step upon analytic data of the business object as determined by the business logic of the business object, and upon completion of the at least one transaction process step, to compute on the server a new lifecycle date of the business object and to store lifecycle dates in the business object following access to the rule set,
the analytical application to provide identification of the business object and the computed lifecycle date of the business object for use by an archiving system prior to the execution of an archive process, wherein the archiving system is coupled to the server and accessible by the analytical application, and
upon execution of a batch archive process, the archiving system to compare lifecycle dates of stored business objects to a current date and archive business objects for which the lifecycle date is elapsed.

7. The enterprise management system of claim 6, wherein:
upon calculation of a lifecycle date and storage thereof in a business object, the analytical application stores an identifier of the respective business object in a hash table accessible by the archiving system, and
upon execution of the batch archive process at the current date, the archiving system performs the comparison only for those business objects that the hash table has linked to the current date.

8. The enterprise management system of claim 6, wherein:
upon calculation of a lifecycle date and storage thereof in a business object, the analytical application stores the calculated lifecycle date and an identifier of the respective business object in an entry of archiving index table accessible by the archiving system, and
upon execution of the batch archive process at the current date, the archiving system performs the comparison only for those business objects listed in entries that archiving index table stores in association with the current date.

9. The enterprise management system of claim 6, wherein the accessing of the rule set is triggered by user interaction with the analytical application causing a business object to be created representing a business analytic performed by a proprietor of the enterprise management system.

10. The enterprise management system of claim 6, wherein the analytical system also refers to the rule set and recalculates a lifecycle date pursuant to a transaction that accesses the business object.

11. An archiving method, comprising:
pursuant to a user initiated transaction with an enterprise management system, creating a business object in a computer system representing the transaction by a transactional application, the business object storing logic defining at least one transaction process step to be performed, data collected during performance of the at least one transaction process step, and a lifecycle date, wherein the transactional application performs a process upon transactional data of the business object as determined by the logic and, upon completion of the process, the life cycle date is computed by the transactional application, storing the business object, including the logic, the collected data and the lifecycle date, in a data storage device associated with a transaction system of the enterprise management system, the transactional application providing identification of the business object and the lifecycle date associated with the business object for use by an archiving system prior to the execution of a batch process of the archiving system, and upon execution of the batch process of the archiving system:

comparing the lifecycle date to a current date, and if the lifecycle date has elapsed, archiving the business object and removing it from the data storage device associated with a transaction system.

12. The method of claim 11, further comprising:

upon calculation of the lifecycle date and storage of the business object, storing an identifier of the respective business object in a hash table accessible by the archiving system, and upon execution of the batch process at the current date, identifying business objects linked by the hash table to the current date and performing the comparing and archiving only for those identified business objects.

13. The method of claim 11, further comprising:

upon calculation of the lifecycle date and storage of the business object, storing an identifier of the respective business object in a archiving index table accessible by the archiving system, and upon execution of the batch process at the current date, identifying business objects linked by the archiving index table to the current date and performing the comparing and archiving only for those identified business objects.

14. The method of claim 11, wherein the archiving comprises copying the business object from the data storage device associated with the transaction system to an archiving storage device and deleting the business object from the data storage device associated with the transaction system.

15. The method of claim 11, wherein the archiving comprises deleting the business object from the data storage device associated with the transaction system.

16. The method of claim 11, wherein the determining comprises:

accessing a stored rule set, identifying an archiving policy to be used based on a type of business object, and calculating the lifecycle date according to the archiving policy.

17. The method of claim 11, further comprising recalculating a lifecycle date pursuant to a second user-initiated transaction that accesses the business object.

* * * * *